United States Patent
Marone et al.

(10) Patent No.: US 10,238,267 B2
(45) Date of Patent: Mar. 26, 2019

(54) INTEGRATED WASHING AGENT DISPENSER, IN PARTICULAR FOR A DISHWASHER

(71) Applicant: BITRON POLAND SP . ZO.O., Sosnowiec (PL)

(72) Inventors: Giuseppe Marone, Nichelino (IT); Adrian Ficek, Jaworzno-Slask (PL)

(73) Assignee: BITRON POLAND SP. ZO.O, Sosnowiee (PL)

( * ) Notice: Subject to any disclaimer, the term of this patent is extended or adjusted under 35 U.S.C. 154(b) by 630 days.

(21) Appl. No.: 14/785,013

(22) PCT Filed: Nov. 26, 2014

(86) PCT No.: PCT/EP2014/075667
§ 371 (c)(1),
(2) Date: Oct. 16, 2015

(87) PCT Pub. No.: WO2015/078913
PCT Pub. Date: Jun. 4, 2015

(65) Prior Publication Data
US 2016/0296099 A1  Oct. 13, 2016

(30) Foreign Application Priority Data
Nov. 26, 2013 (PL) ......................... 406269

(51) Int. Cl.
A47L 15/44 (2006.01)
F03G 7/06 (2006.01)

(52) U.S. Cl.
CPC ....... *A47L 15/4409* (2013.01); *A47L 15/4463* (2013.01); *F03G 7/065* (2013.01)

(58) Field of Classification Search
CPC ... A47L 15/4409; A47L 15/4463; F03G 7/065
(Continued)

(56) References Cited

U.S. PATENT DOCUMENTS

2004/0118434 A1  6/2004  Virgilio et al.
2007/0215653 A1*  9/2007  Marone ............... A47L 15/4409
                                                            222/651

FOREIGN PATENT DOCUMENTS

EP          1 740 082 B1   7/2008
WO      2005/099553 A3   10/2005
WO      2013/092813 A3    6/2013

OTHER PUBLICATIONS

International Search Report of PCT/EP2014/075667 dated Feb. 10, 2015.
(Continued)

*Primary Examiner* — Levon J Shahinian
(74) *Attorney, Agent, or Firm* — Sughrue Mion, PLLC

(57) ABSTRACT

A dispensing device (1) for a door of a dishwasher, includes a support body (2) having first and second, longitudinally adjacent, dispensers (5-7; 9, 10), for a washing agent and a rinse agent, respectively; and an electrically controlled actuator device (13), having a stationary structure (15) and a mobile member (18), coupled to the first dispenser (5-7) such that when the door is closed a first energization of the actuator device (13) causes the dispensing of the washing agent, and coupled to the second dispenser (9, 10) through a transmission mechanism including an interconnecting member (30) which makes the mechanism operative after a first energization of the actuator device (13) after the door is closed, to allow dispensing of the rinse agent by a subsequent energization of the actuator device (13). The interconnecting member (30) has an inactive position in which the mechanism is inoperative when the door is opened.

7 Claims, 12 Drawing Sheets

(58) Field of Classification Search
USPC .......... 134/56 D, 57 D, 58 D, 94.1; 222/651; 337/123, 140
See application file for complete search history.

(56) References Cited

OTHER PUBLICATIONS

Written Opinion of the International Searching Authority of PCT/EP2014/075667 dated Feb. 10, 2015.

\* cited by examiner

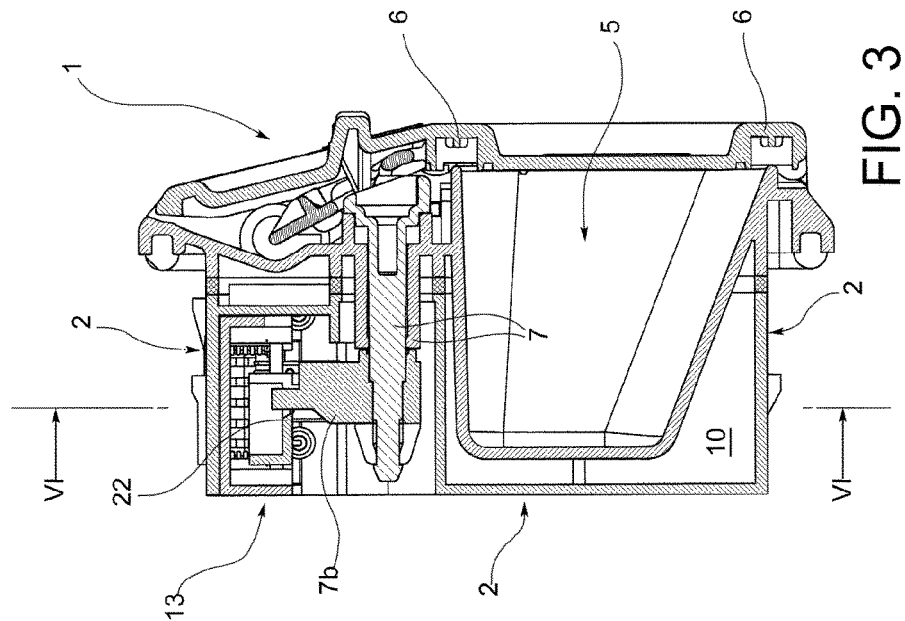
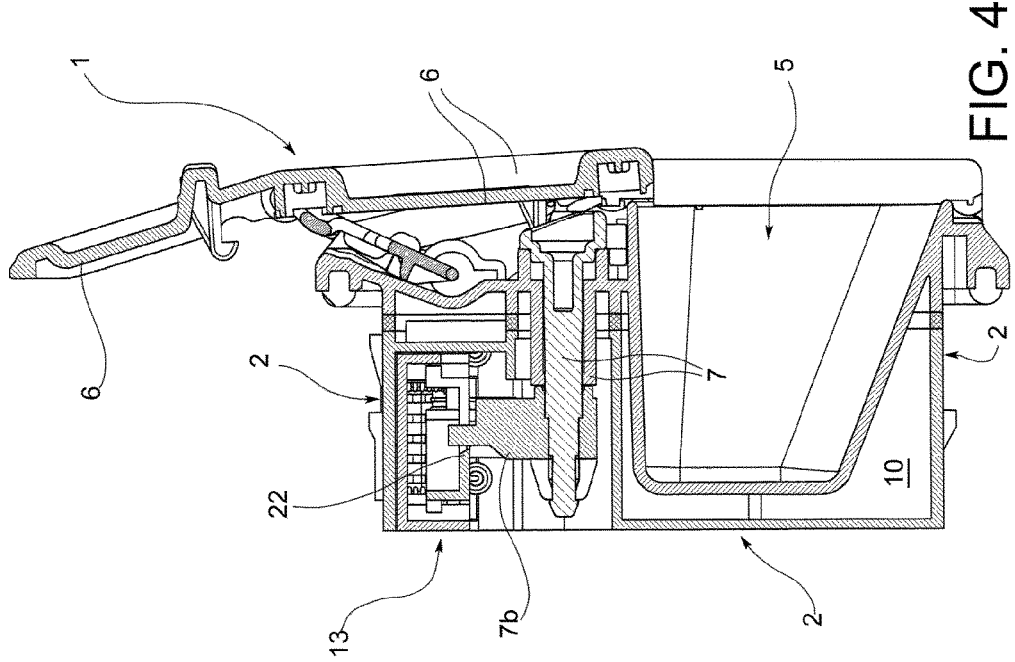

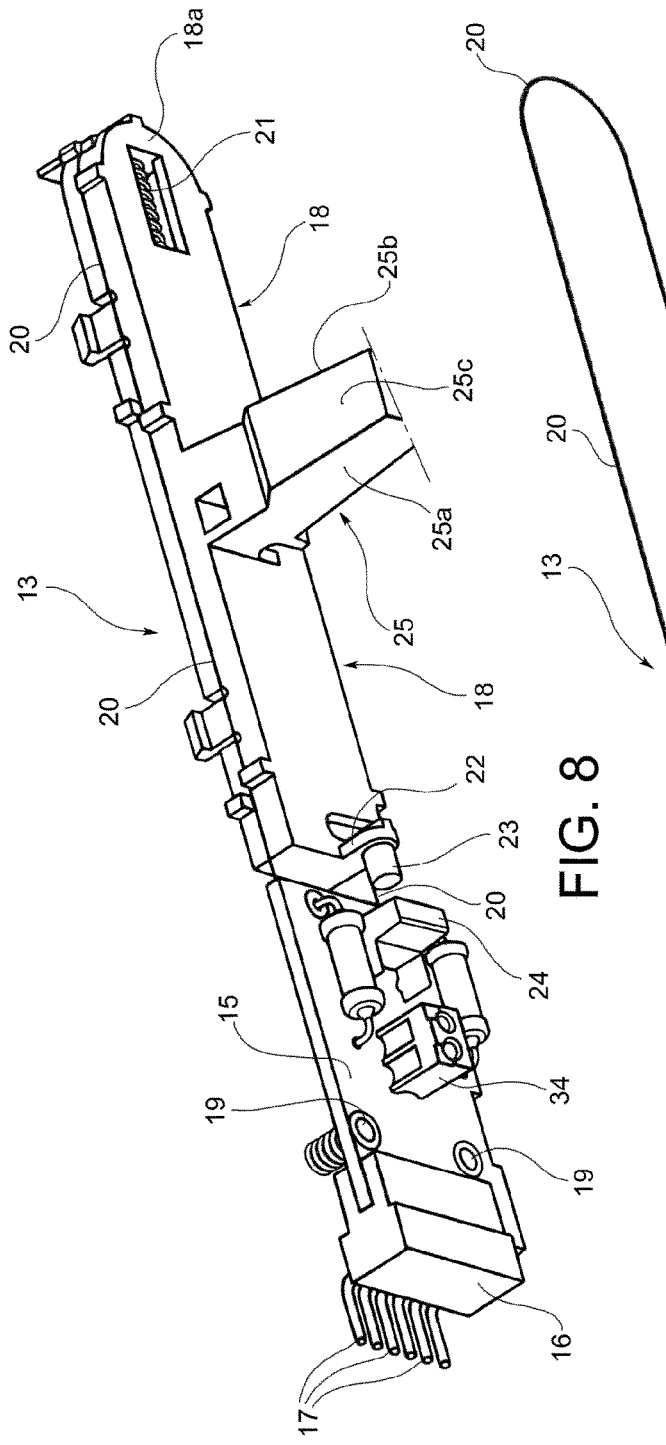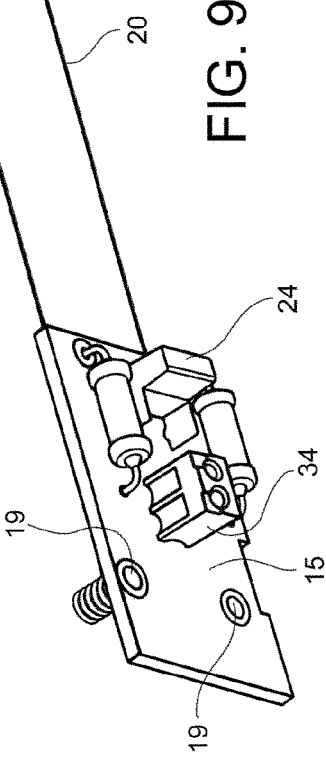

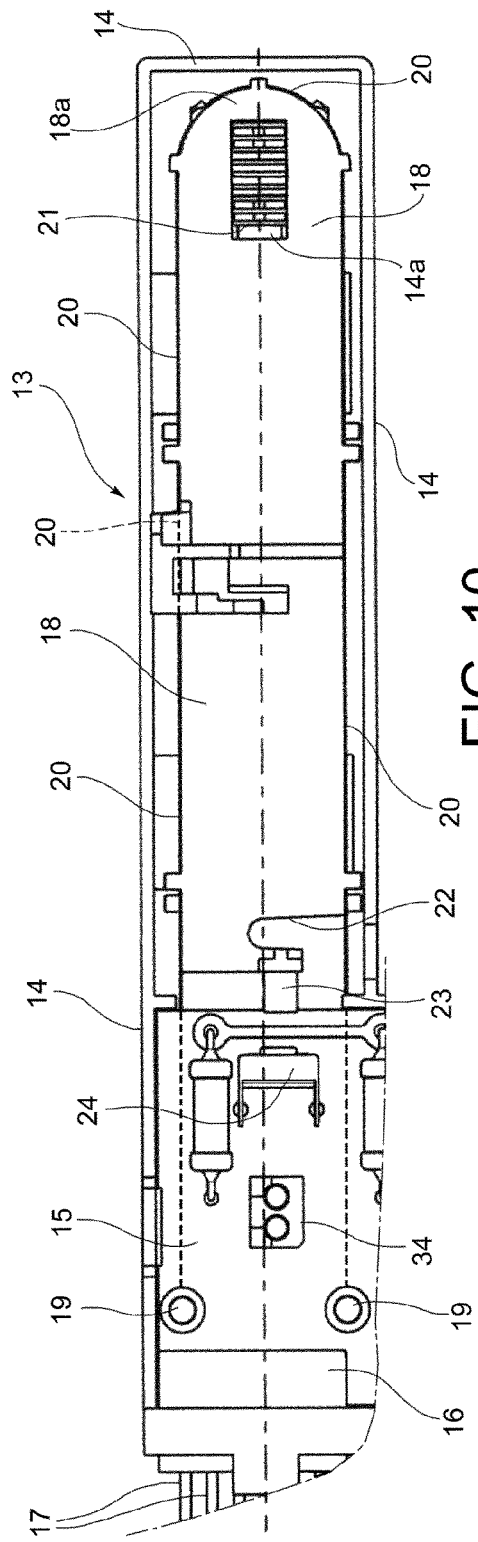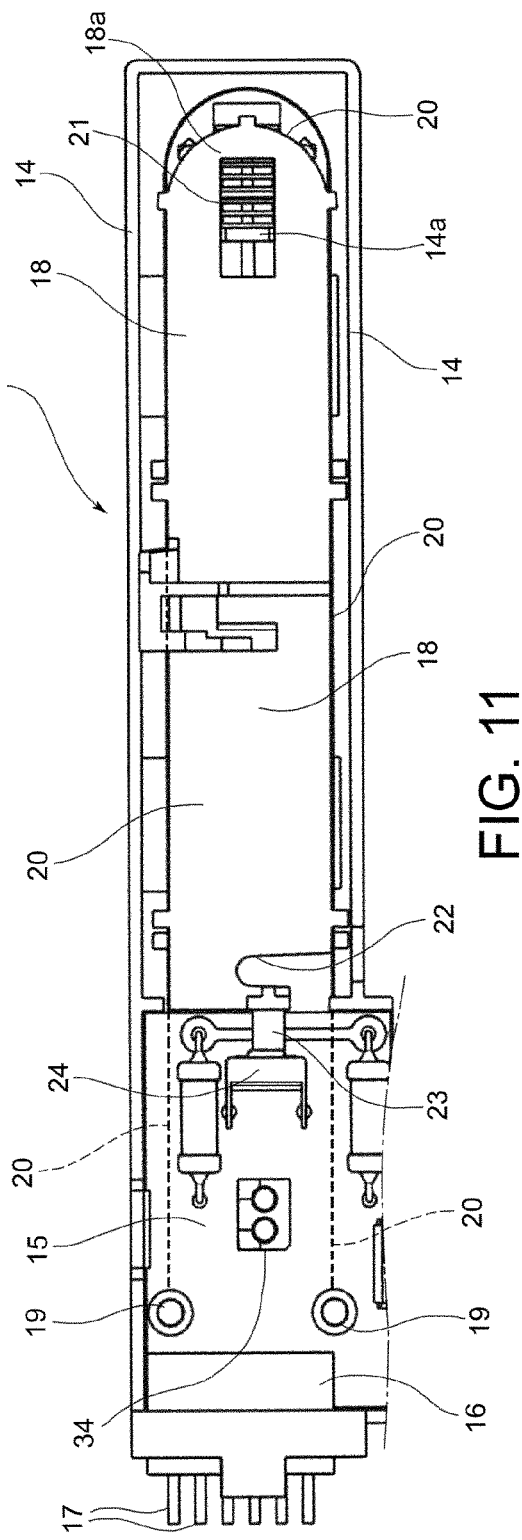

INTEGRATED WASHING AGENT DISPENSER, IN PARTICULAR FOR A DISHWASHER

CROSS REFERENCE TO RELATED APPLICATIONS

This is a National Stage of International Application No. PCT/EP2014/075667 filed Nov. 26, 2014, claiming priority based on Polish Patent Application No. 406269 filed Nov. 26, 2013, the contents of all of which are incorporated herein by reference in their entirety.

BACKGROUND

The present invention relates to an integrated dispenser for washing and rising agents, in particular for a pivotable door of a dishwasher.

More specifically, the present invention concerns an integrated dispensing device comprising
  a support body having an elongate shape, wherein there are provided first and second longitudinally adjacent dispensers, for a washing agent and a rinsing agent, respectively, and
  an electrical controlled actuator device, comprising a stationary structure and an actuation member movable with respect thereto, the actuator device being coupled to the first dispenser such that when the door is closed a first energisation of the actuator device causes the dispensing of the washing agent, and coupled to the second dispenser through a transmission mechanism including a pivotable interconnecting member adapted to make said mechanism operative after a first energisation of the actuator device once the door is closed, to allow the dispensing of the rinsing agent by a subsequent energisation of the actuator device; said interconnecting member being adapted to assume, under gravity, an inactive position in which it makes said mechanism inoperative once the door is opened.

An integrated dispensing device of that type is disclosed for instance in EP 1 740 082 B1. In said known device the electrically controlled actuator is of the kind comprising a solenoid and an associated movable core. The actuator is disposed within the support body of the dispensing device, such that the movable core thereof is translatable along a direction which, in the operation, is vertical and orthogonal to the longitudinal direction of said support body. The movable core of said solenoid actuator interacts with an arm of a rocker lever which controls the dispensing of the washing agent. After a first energisation of the actuator device after the door of the dishwasher has been closed, said arm of the rocker lever couples mechanically with an interconnecting member which is pivotably connected directly onto a movable control member of the second dispenser, such that the subsequent energisation of the actuator device causes the dispensing of the rinsing agent.

Said integrated dispensing device according to the prior art is inherently expensive, because of the use of a solenoid actuator. Furthermore, the arrangement of such an actuator device and the mechanism coupling it with the first and second dispensers requires a lot of space, reducing in particular the space available for containing the rinsing agent.

From WO 2013/092813 A2 an integrated dispensing device is known, which includes an actuator including a wire of a shape-memory material which follows an essentially M-shaped path, with three changes of direction between the ends thereof, and therefore with considerable frictions.

An object of the present invention is to provide an improved washing and rinsing agent dispensing device which allows to overcome the above-outlined inconveniences of the prior art devices.

SUMMARY OF THE INVENTION

This and other objects are achieved according to the invention by an integrated dispensing device of the initially defined kind, characterised in that said movable member of the actuator device is a slider movable with respect to said stationary structure along the longitudinal direction of said body, between a rest position and a working position, and in that
  said actuator device further comprises a wire made of a shape-memory material, having its ends connected to said stationary structure and extending along a U-shaped path which passes around a portion of the slider opposite said structure;
  the arrangement being such that when said wire is energised by an electric current, it shortens and causes a displacement of the slider from the rest position to the working position, against the action of resilient contrast means, and when it is de-energised said wire re-elongates allowing a displacement of the slider toward the rest position;
  said interconnecting member being carried by and connected pivotably to said slider.

BRIEF DESCRIPTION OF THE DRAWINGS

Further features and advantages of the invention will become apparent from the following detailed description, provided merely by way of a non-limiting example, with reference to annexed drawings, wherein:
FIG. 3 is a cross-section taken along line III-III of FIG. 1 and shows the dispensing device in a condition wherein a cover of the washing agent dispenser is in the closed position;
FIG. 4 is a cross-sectional view similar to that of FIG. 3 and shows the cover of the washing agent dispenser in the open position;
FIGS. 8 and 9 are partial perspective views showing said actuator device;
FIGS. 10 and 11 are plan bottom views of the actuator device according to FIGS. 7 to 9, showing two different operating conditions.

DETAILED DESCRIPTION OF THE INVENTION

Figure 1:
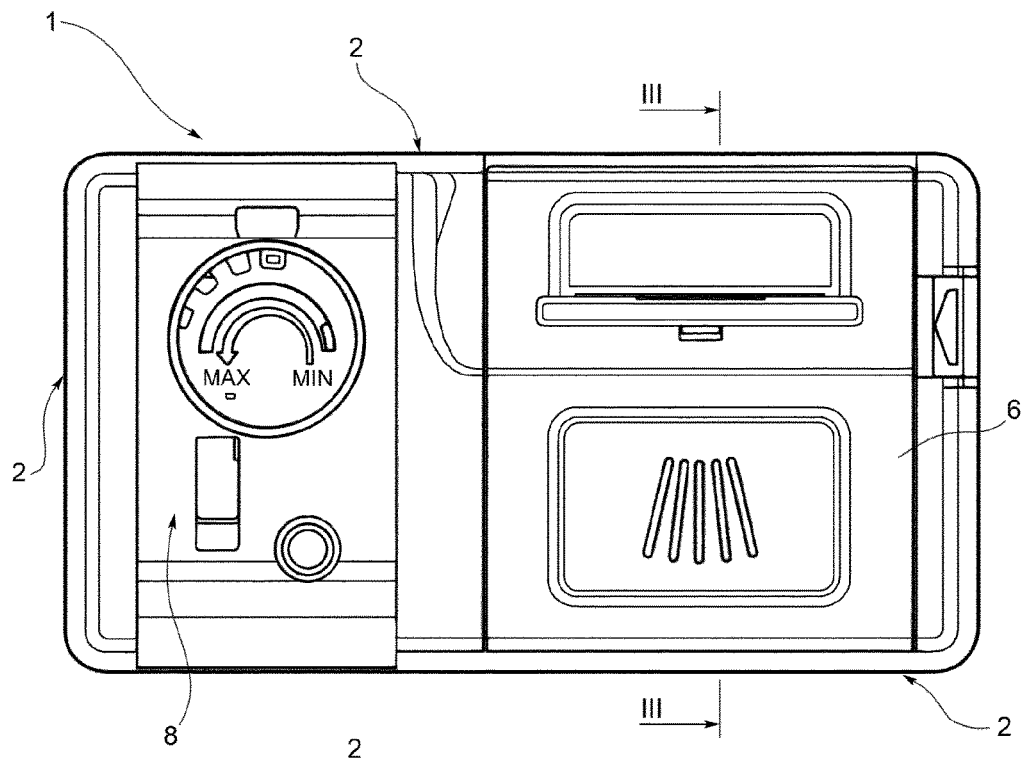
FIG. 1 is a front view of an integrated dispensing device according to the present invention.

In the drawings an integrated dispensing device according to the invention is generally indicated 1. Such a device is intended to be fitted to the inside surface of the front door of a dishwasher.

The door of a dishwasher is usually hinged to the body of the machine along its bottom edge and can be opened into a substantially horizontal position (loading position) in order to place dishes and utensils needing washing in the washing chamber, or to remove them after washing. The door, in its closed condition, lies in an essentially vertical position (working position) in which it closes the washing chamber in a liquid-tight manner.

The integrated dispensing device 1 mounted in the door of a dishwasher is therefore also displaced, in use, between an essentially horizontal loading position, wherein it can be loaded with a detergent and a rinsing agent, and a vertical working position wherein the dispensing device faces the washing chamber and can be operated to dispense the detergent and a dose of rinsing agent during an operating cycle of the machine.

In the present description and in the appended claims the term detergent or washing agent should be understood to mean any type of detergent or soap used in a dishwashing cycle. The term rinse agent should be understood to mean any product that can be used to improve the shine on clean items.

The integrated dispensing device 1 includes an elongate body 2, for instance of plastics material, to be fitted into a corresponding aperture predisposed in the door of a dishwasher.

The body 2 can be made in two parts, for example a main or front portion and an auxiliary or rear portion, both produced by injection moulding and then connected together and heat-welded using a hot blade device.

With reference to FIGS. 3 and 4, a tub-like receptacle 5 for containing a quantity of a detergent is formed in the front surface of the body 2 which in use will face towards the washing chamber of the dishwasher.

Figure 5:
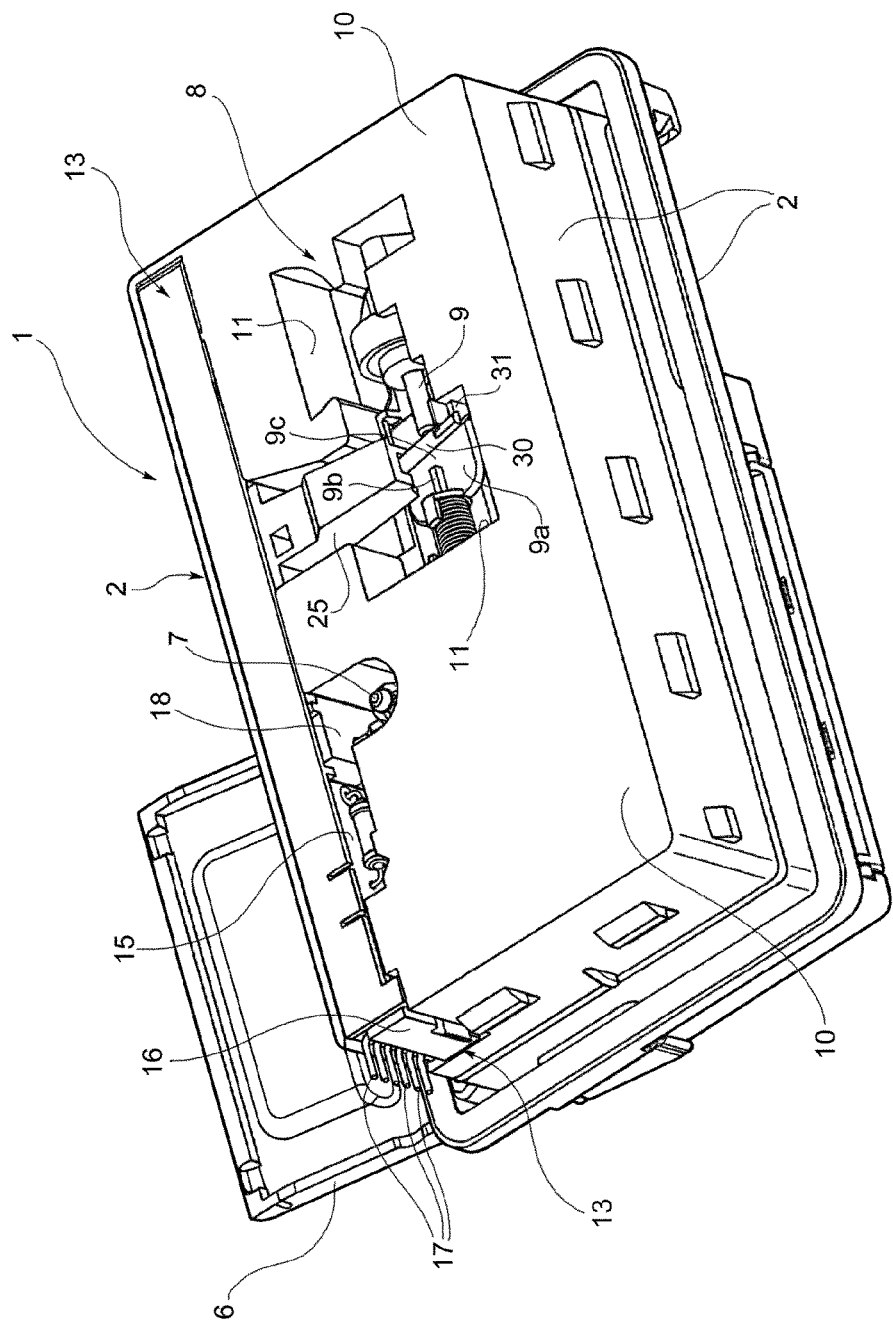
FIG. 5 is a rear perspective view of the dispensing device according to the preceding figures.

The receptacle 5 has an associated cover 6, which is movable, in a per se known manner, from a closed position, shown in FIG. 3, to an open position, shown in FIGS. 4 and 5.

In the closed position the cover 6 is retained by an arm 7*a* (FIG. 7) of a shaft 7 which extends transversely through the body 2 of the integrated dispense and device 1.

During a washing cycle, as it will be disclosed later in greater detail, an actuator device 13 causes a rotation of the shaft 7 whose arm 7*a* causes the cover 6 to pass from the closed position (FIG. 3) to the open position (FIG. 4) allowing the detergent contained in the receptacle 5 to be dispensed to the washing chamber of the machine.

In the support body 2 of the integrated dispensing device 1 there is provided a further dispenser, generally indicated 8, for dispensing doses of a rinsing or shining agent. The dispenser 8 is longitudinally adjacent the dispenser 5, 6 for the washing agent and comprises a dispensing control member indicated 9 in FIGS. 2, 7 and 13-19.

The dispenser 8 for the rinse agent comprises a shaped reservoir provided in the body 2 and indicated 10 in FIGS. 2 to 6. The reservoir 10 has a capacity corresponding to a plurality of doses of rinse agent, to be dispensed in a number of operating cycles of the machine.

With reference for instance to FIG. 5, the control member 9 for dispensing the rinse agent is mounted translatable along the longitudinal direction of body 2, within a recess 11 provided in the rear of said body.

Figure 7:
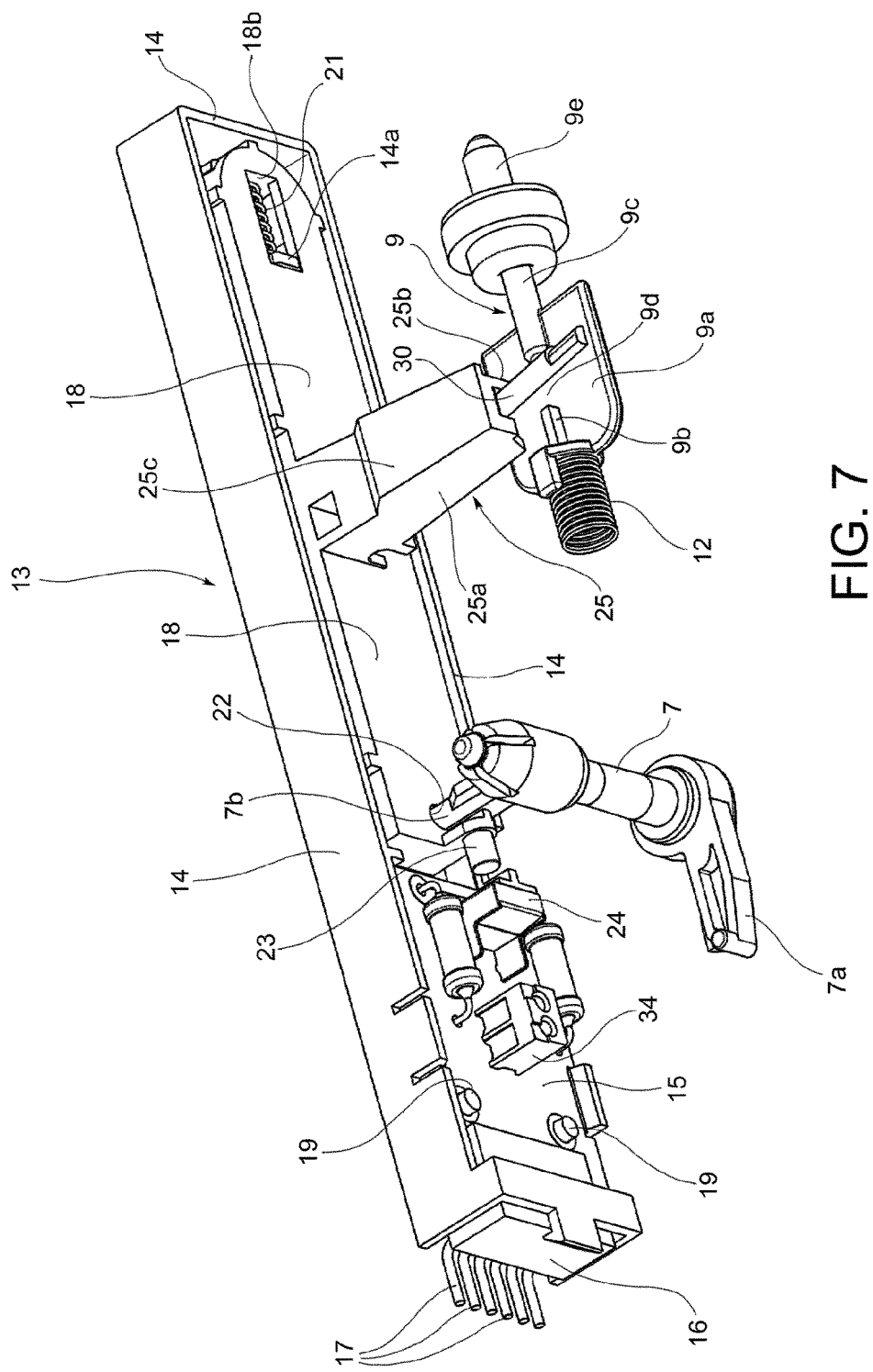
FIG. 7 is a partial perspective view which shows an electrically controlled actuator device comprised in the integrated dispensing device according to the preceding figures.
Figure 12:
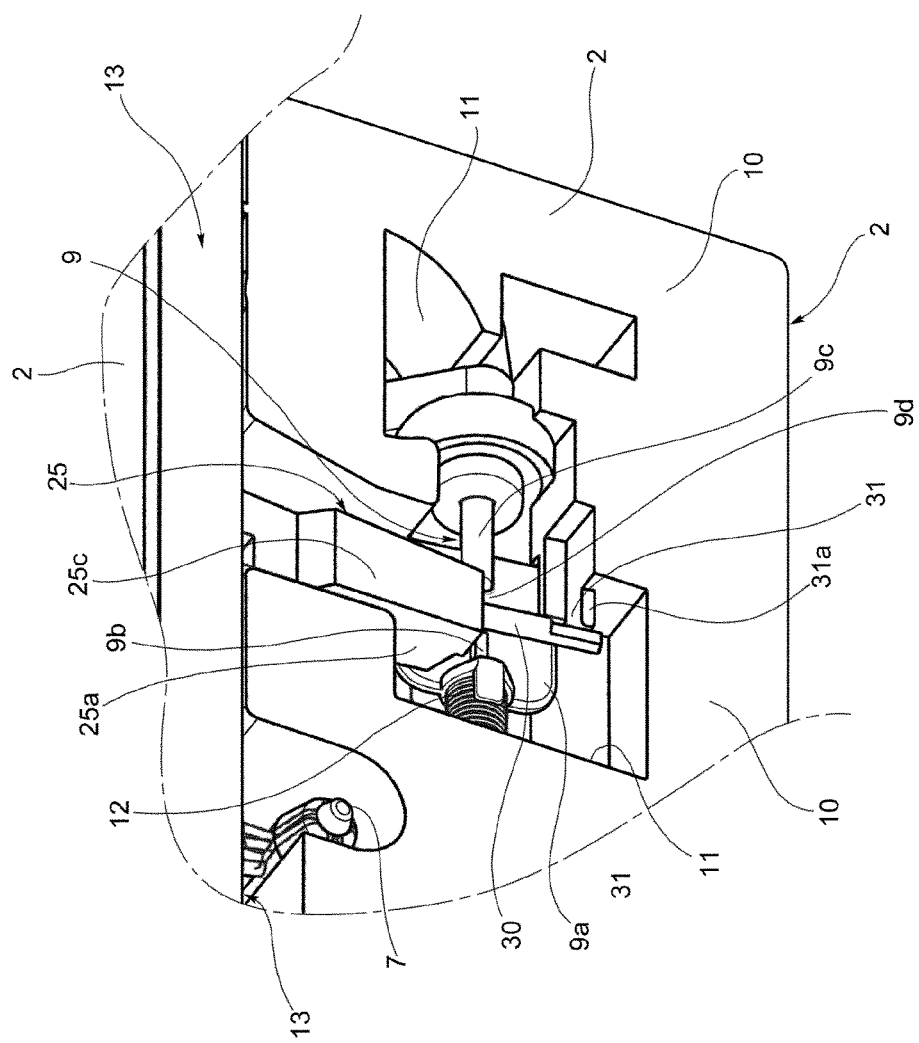
FIG. 12 is a rear, partial perspective view showing the coupling of the actuator device with the rinsing agent dispenser.

In the illustrated embodiment, the member 9 comprises at one end a plate-like formation 9*a*, having on one main face a longitudinal projection 9*b* (see for instance FIG. 7).

Opposite said projection, the plate-like portion 9*a* joins with a rod portion 9*c*, which extends in part also on the same main face of the plate-like portion 9*a* which is provided with the projection 9*b*.

Between the projection 9*b* and the opposite end of the rod portion 9*c*, in the plate-like portion 9*a* of the member 9 there is defined a recessed interspace indicated 9*d*.

At the end opposite the plate-like portion 9*a*, the movable control member 9 has one end 9*e* (FIG. 7) acting as an obturator for a rinse agent dispensing valve, in a solution similar to that described and illustrated in EP 1 740 082 B1.

Figure 2:
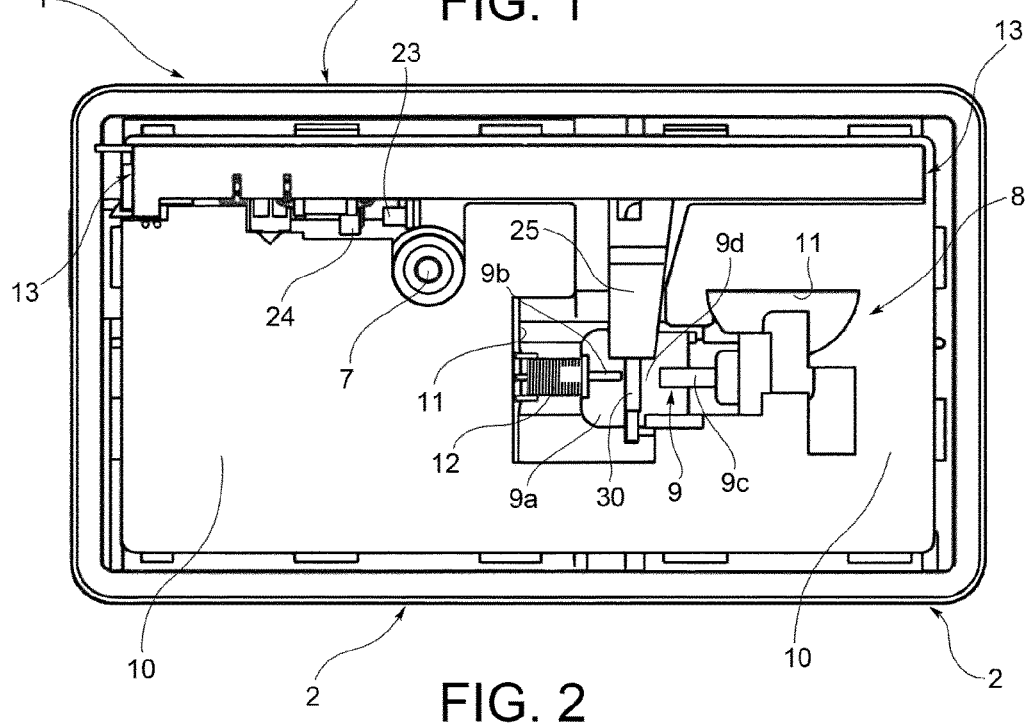
FIG. 2 is a rear view of the integrated dispensing device according to FIG. 1.

A helical spring 12 is interposed between the plate-like portion 9*a* of the member 9 and the opposite wall of the recess 11, and tends to urge said member 9, toward the right for the observer of for instance FIGS. 2 and 5.

The integrated dispensing device 1 comprising an electrically controlled actuator, generally indicated 13 in the drawings.

In the illustrated embodiment the actuator device 13 essentially comprises a support structure 14, having an elongate shape and made for instance of a plastics material, to which there is fixed a circuit board 15 (see in particular FIGS. 7-11).

Figure 6:
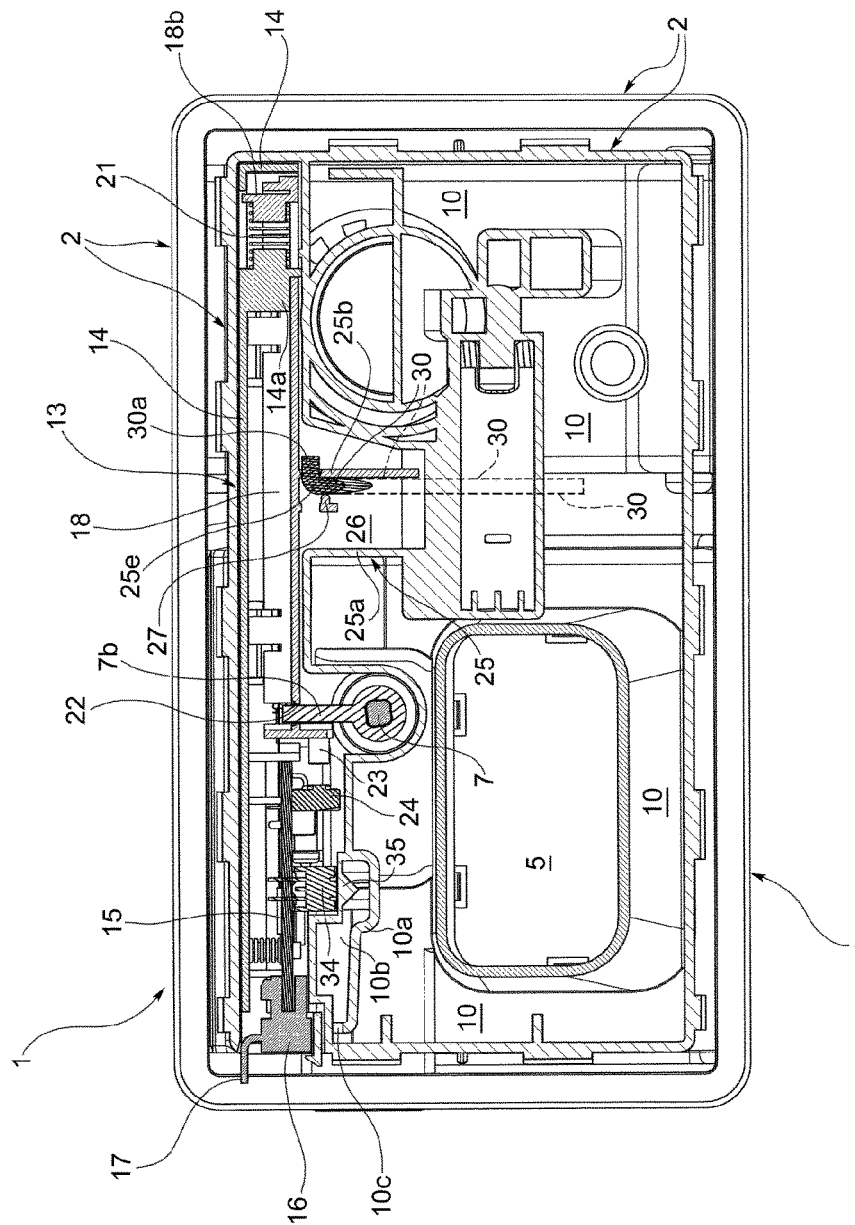
FIG. 6 is a cross-sectional view taken along line VI-VI of FIG. 3.

The board 15 carries at one end a multipolar connector 16, whose terminals or pins 17 are accessible at one end of the body 2 of the integrated dispensing device 1, as it can be seen for instance in FIGS. 5 and 6.

The board 15 also carries a plurality of electric/electronic components, some of which will be later described in greater detail.

In the exemplary embodiment illustrated, the board 15 extends approximately over one third of the longitudinal extension of the support body 2 of the integrated dispensing device 1.

As it can be seen for instance in FIG. 7, inside the support structure 14, in proximity to the board 15, there is provided a slider generally indicated 18.

With reference in particular to FIGS. 8 to 11, the actuator device 13 comprises further a wire 20 of a shape-memory material, for instance a material based on a titanium alloy.

The wire 20 has its ends connected to two terminals 19 of the board 15, and extends along an essentially U-shaped path, which passes around a convex rounded end portion 18*a* of the slider 18, opposite board 15.

As it can be better seen in FIG. 6, a helical spring 21 extends between an end projection 18*b* of the slider 18 and a projection 14*a* of the support structure 14. Said spring 21 tends to urge the slider 18 away from the board 15, toward a rest position shown in FIGS. 5 to 8, 10 and 13.

The end of the slider 18 close to the board 15 is provided with an indentation 22 (FIGS. 6 to 8) in which the end of a second transverse arm 7*a* of the shaft 7 extends (FIGS. 6 and 7).

The above-described arrangement is such that when, once the dishwasher door has been closed, the control unit of said machine causes a first energisation of the actuator device 13, causing an electric current to flow in the shape-memory wire 20. The latter shortens and causes a translation of the slider 18 from the rest position shown in FIGS. 5 to 8 and 10 to the working position shown in FIG. 11.

This translation of the slider 18 causes a rotation of the shaft 7, in the counter-clockwise direction for the observer of FIGS. 2, 6 and 7, and the passage of the cover 6 from the closed position of FIG. 3 to the open position of FIG. 4, allowing the dispensing of the detergent contained in the receptacle 5.

Conveniently, as it can be seen in FIGS. 7, 8, 10 and 11, to the end of the slider 18 close to the board 15 there is fastened an activating member 23 which, when said slider 18 is in the working position of FIG. 11, causes the switching of a micro-switch 24 carried by the circuit board 15.

Said micro-switch 24 acts as a position sensor and communicates, in use, to the electronic control unit of the dishwasher that the cover 6 has been driven open and the detergent contained in the receptacle 5 has been dispensed to the washing chamber of the machine.

The slider 18 is also coupled with the control member 9, in the manner which will be better disclosed in the following, for controlling the dispensing of the rinse agent by the dispenser 8.

Figure 14:
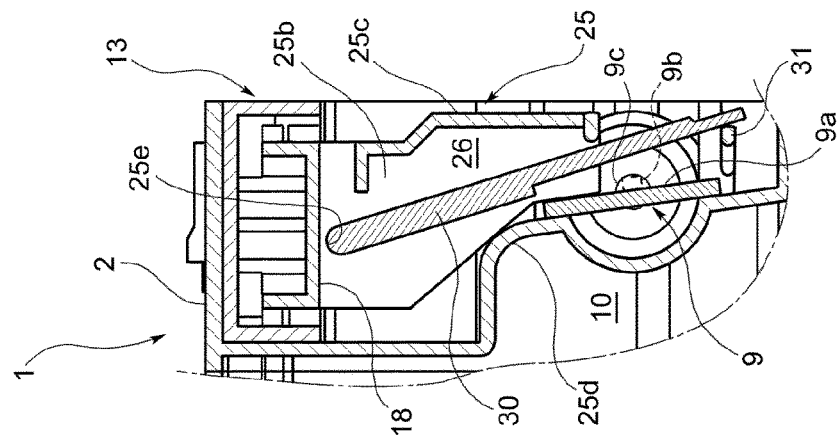
FIG. 14 is a cross-sectional view taken along line XIV-XIV of FIG. 13.

In the embodiment illustrated, from the intermediate portion of the slider 18 there extends a formation 25, having two side walls 25*a*, 25*b*, facing each other in the longitudinal direction of the body 2 of the integrated dispenser 1, as well as a front wall 25*c* and a rear wall 25*d* (see in particular FIGS. 7, 8 and 14).

Figure 16:
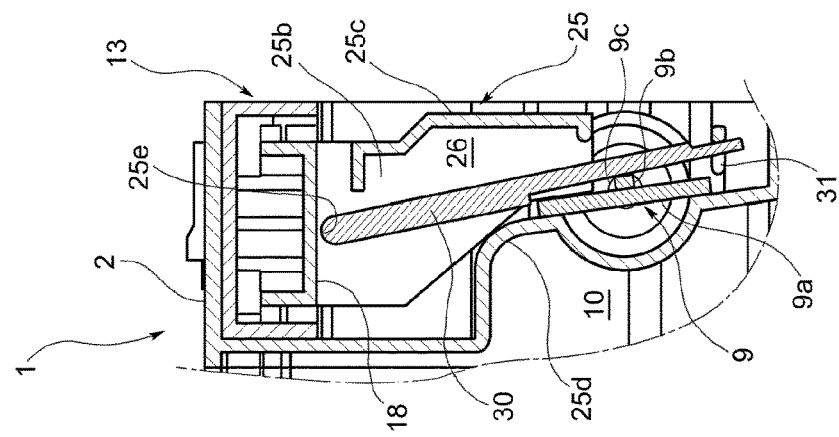
FIG. 16 is a cross-sectional view taken along line XVI-XVI of FIG. 15.
Figure 15:
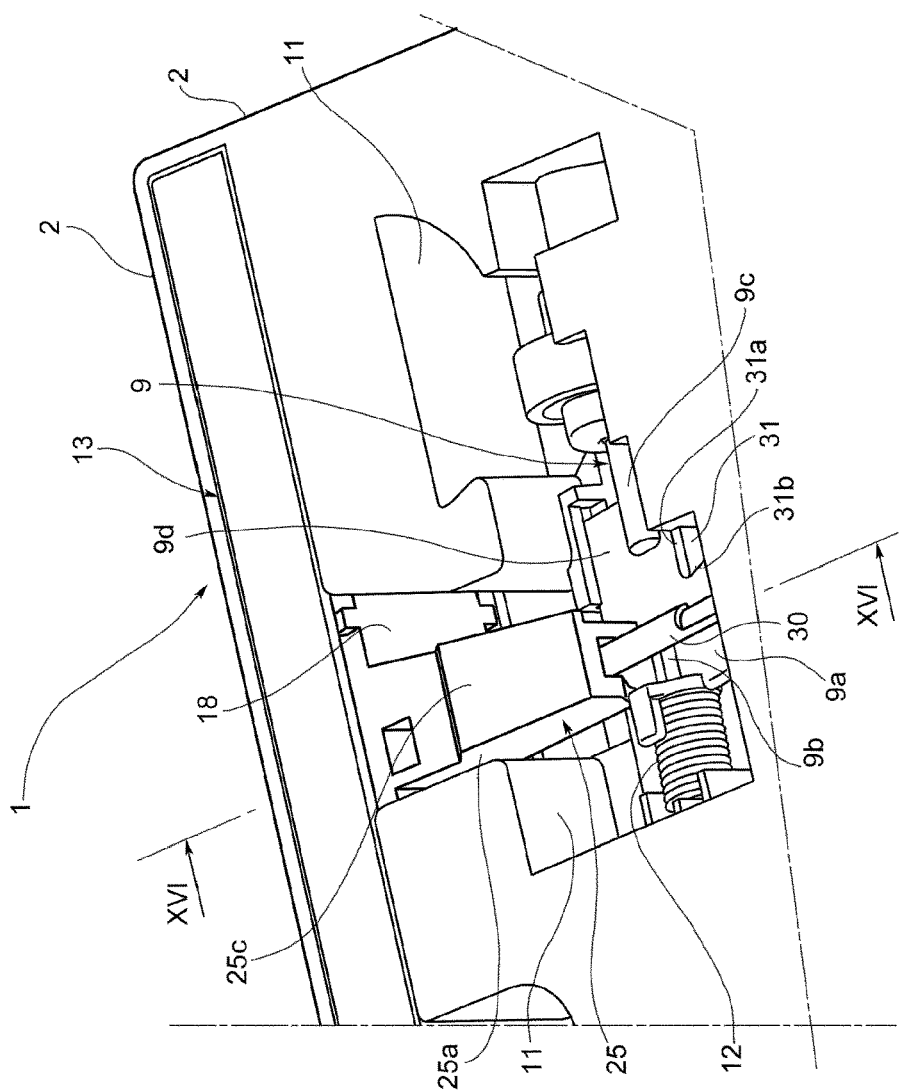
FIG. 15 is a cross-sectional view similar to that shown in FIG. 13 and shows the condition of the integrated dispensing device after the first energisation of the actuator device following closure of the dishwasher door.
Figure 18:
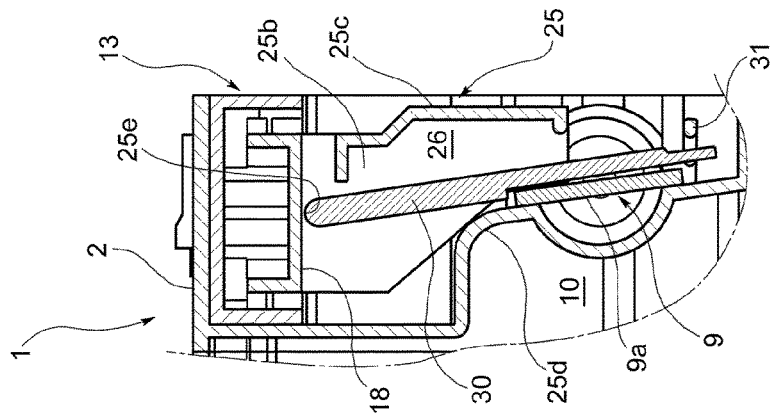
FIG. 18 is a cross-sectional view taken along line XVIII-XVIII of FIG. 17.

Inside the formation 25 there is defined a wide passage, which is essentially vertical, indicated 26 in FIGS. 6, 14 and 16.

Inside the region or passage 26 there is pivotably mounted a rod 30, made for instance of a metal material.

As it can be better seen in FIG. 6, the rod 30 as a whole has a shape essentially like a capsized L, and its upper end 30*a* is transversely bent and is pivotably engaged in an opening 25*e* of the wall 25*b* of the formation 25.

With reference to FIG. 6, within the passage 26 defined inside the formation 25, a projection 27 limits the oscillations of the rod 30 in the plane of said figure.

The lower end of the rod 30 protrudes downwardly beyond the lower end of the formation 25, as it can be seen for instance in FIGS. 7 and 13-18. Said lower end of the rod 30 extends within the recess 11, in particular between the spring 12 and the portion 9*c* of the control member 9.

Inside said recess 11, in the region longitudinally comprised between the projection 9*b* and the portion 9*c* of the control member 9 the body 2, 10 is provided with an integral, protruding, engagement formation 31 which extends in a plane substantially parallel with the slider 18, and which has an essentially triangular profile (see FIGS. 5 and 12-18).

The formation 31 has a longitudinal side or cathetus 31*a* (FIGS. 12 and 13) which is essentially parallel with the projection 9*b* of the plate-like portion 9*a* of the control member 9, and an oblique side or hypotenuse 31*b* (see for instance FIGS. 13 and 15) which is inclined toward the front of the integrated dispenser 1 and toward portion 9*c* of the control member 9.

The above-described arrangement is such that the dispensing of the rinse agent by the dispenser 8 is caused by (at least) one second energisation of the actuator device 13 after the dishwasher door has been closed.

When the dishwasher door has been closed, the slider 18 is in the rest position shown in FIGS. 5 to 7, 10, 13 and 14. In that condition, the rod 30 extends inclined with respect to the vertical direction (see FIG. 14) and the lower end thereof insists, under gravity, against the side 31*a* of the engagement formation 31, as it can be seen for instance in FIG. 13. In that condition the rod 30 extends transversely outside the interspace 9*d* defined between the projection 9*b* and the portion 9*c* of the control member 9.

As already described above, once the dishwasher door has been closed the first energisation of the shape-memory wire 20 causes a translation of the slider 18 toward the circuit board 15 and the consequent rotation of the shaft 7 which, by means of its arm 7*a*, causes the cover 6 to open. The latter uncovers the receptacle 5, and the detergent contained therein is dispensed toward the washing chamber. Said translation of the slider 18 causes a corresponding translation of the rod 30, which leaves the side 31*a* of the engagement formation 31 and comes to rest against the projection 9*b* of the plate-like portion 9*a* of the control member 9 (see FIGS. 15 and 16). Also in that condition the rod 30 is inclined, with respect to the vertical direction, such that gravity urges it against the projection 9*b*.

Said translation of the slider 18 causes, through its member 23, the switching of the micro-switch 24 and the communication to the control unit of the dishwasher that the detergent contained in the receptacle 5 has been dispensed.

The control unit of the dishwasher causes thereafter the de-energisation of the shape-memory wire 20, which re-elongates. The slider 18 can thus translate toward the rest position under the action of the associated contrast spring 21. During this translation of the slider 18 the rod 30 slides initially on the projection 9*b* of the control member 9, and then falls by gravity into the interspace 9*d* defined between said projection 9*b* and the end of the portion 9*c* of the member 9, assuming the position shown in FIGS. 17 and 18. The translation of the slider 18 toward the rest position also determines a new switching of the micro-switch 24.

Subsequently, in the course of the operating cycle, the control unit of the dishwasher causes a new energisation of the shape-memory wire 20, which shortens again, causing a new translation of the slider 18 toward the circuit board 15. This translation of the slider 18 causes a corresponding translation of the rod 30, which now engages the facing end of the projection 9*b* of the control member 9. Also in this condition the rod 30 is preferably inclined with respect to the vertical direction.

The further translation of the slider 18 causes the control member 9 to be dragged because of the engagement of the rod 30 with the projection 9*b*. The control member 9 passes thus to the position in which the rinse agent dispensing valve is opened.

The dispensing of the rinse agent can be controlled, by the electronic unit of the dishwasher, in different manners.

In a first a manner, the dispensing of the rinse agent is simply based on the energisation time of the shape-memory wire 20, which can be a continuous energisation interval for said wire 20, or, and preferably, divided into a number of energisations/de-energizations controlled by the electronic unit of the dish-washer on the basis of the signals correspondingly provided by the microswitch 24.

Figure 17:
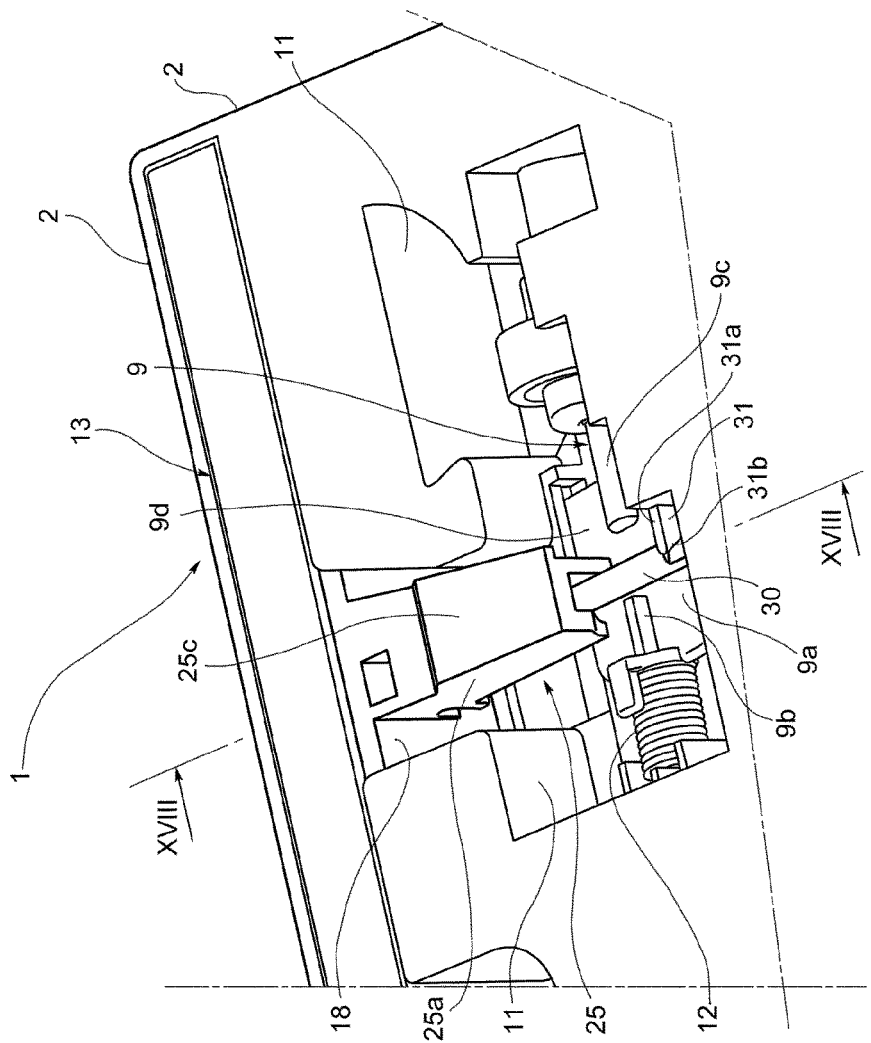
FIG. 17 is a cross-sectional view similar to that of FIG. 15 and shows the integrated dispensing device in a condition wherein a pivotable interconnecting member makes a transmission mechanism operative between the actuator device and the rising agent dispenser.

Once the dispensing of the rinse agent is completed the shape-memory wire 20 is definitely de-energised. It re-elongates, and the slider 18 returns to the rest position. Once that position has been reached, the rod 30 is engaged between the hypotenuse 31*b* of formation 31 and the plate-like portion 9*a* of the control member 9, as shown in FIG. 17.

Once the washing cycle is over, when the door of the dishwasher is opened the formation 31 passes from the horizontal attitude to an essentially vertical attitude and the rod 30, pivoting under gravity, descends along the hypotenuse 31*b* of said formation 31, reaching again a position where in it insists against the cathetus 31*a* of said formation.

Figure 13:
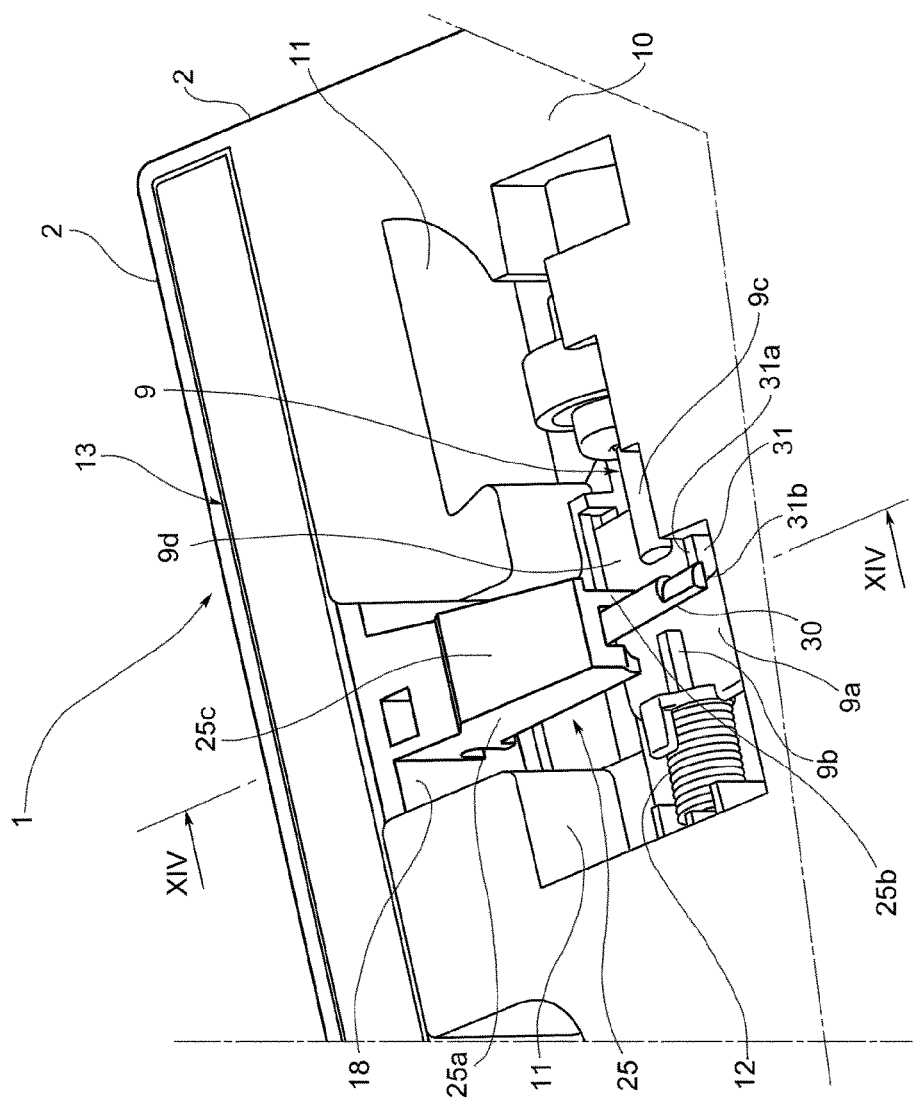
FIG. 13 is a partial, rear perspective view showing the integrated dispensing device in a condition immediately following the closing of the dishwasher door.

When the door is subsequently closed, the rod 30 is again in the start-of-cycle position shown in FIGS. 13 and 14.

Figure 19:
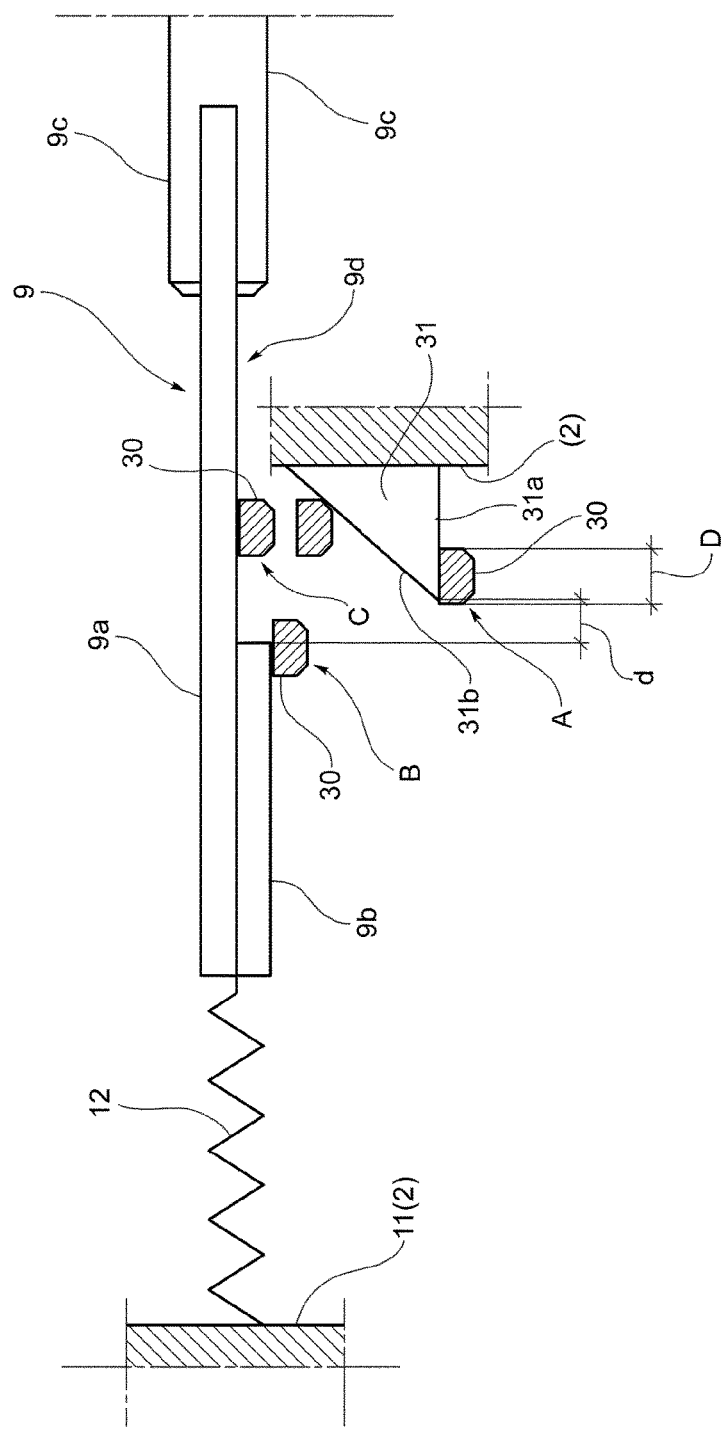
FIG. 19 is a diagrammatical representation which illustrates different positions taken, in the operation, by said pivotable interconnecting member.

FIG. 19 diagrammatically illustrates the main operating positions of the rod 30 during a washing cycle. In that figure, parts and element equal or corresponding to parts and elements which have already been described have been attributed again the same references used previously.

For a correct operation, the distance d which longitudinally separates the projection 9*b* of the control member 9 from the distal vertex of the formation 31 is conveniently shorter than the width D of the rod 30.

This ensures that, in each operating cycle, the first energisation of the shape-memory wire 20 causes the passage of the rod 30 from the position indicated A in FIG. 19 to the position therein indicated B, avoiding that during said transition the rod 30 may fall into the interspace 9*d* comprised between said projection 9*b* and the portion 9*c* of the control member 9.

During the first energisation of the shape-memory wire 20, the rod 30 can further translate, to the left for the observer of FIG. 19, until when the slider 18 reaches its working position.

During the subsequent de-energisation and cooling of the wire 20, the slider 18 returns towards its rest position and the rod 30 slides, toward the right for the observer of FIG. 19, on the projection 9*b*, passing through position B and reaching thereafter a position indicated C when the slider 18 reaches the rest position. In position C the rod 30 insists against the plate-like formation 9*a* of the control member 9, in the interspace 9*d*.

The subsequent energisation of the shape-memory wire 20 causes a translation of the slider 18 towards the working position. The rod 30 correspondingly translates, sliding against the plate-like portion 9*a* of the member 9, within the interspace 9*d*, until it engages and then drags, toward the left for the observer of FIG. 19, the projection 9*b* and thus the control member 9 as a whole, to start the dispensing of the rinse agent.

Once the dispensing of the rinse agent is completed, the shape-memory wire 20 is finally de-energised and the slider 18 returns towards the rest position. The rod 30 correspondingly reaches the position indicated C in FIG. 19.

When, later, the dishwasher door is opened, the lower end of the rod 30 falls toward the hypotenuse 31*b* of the formation 31 and descends sliding on said hypotenuse by the effect of gravity, reaching again the position indicated A.

The circuit board 15 conveniently also carries an emitter-receiver pair (for instance a photodiode-phototransistor pair), generally indicated 34 in FIGS. 6 to 11, disposed facing a prism formation 35 (FIG. 6), integrally provided in one wall of the reservoir 10 for the rinse agent. The prism formation 35 is of an at least partially transparent material.

In the reservoir 10 for the rinse agent, close to the prism formation 35, there is provided a shaped wall 10*a* which delimits a chamber 10*b* having a by far smaller capacity than the rest of the reservoir 10. The chamber 10*b* is adapted to be put in hydraulic communication with the rest of the internal region of the reservoir 10 through a passage indicated 10*c* in FIG. 6, when the door is opened.

The arrangement is such that when the door of the dishwasher is open, in an at least approximately horizontal attitude, the liquid rinse agent contained in the reservoir 10, through the passage 10*c* partially fills the chamber 10*b*.

When the door is subsequently brought to the vertical closed position, an amount of rinse agent remains trapped in the chamber 10*b*, on the shaped wall 10*a*.

The emitter-receiver pair 34 allows, through the prism formation 35, to detect the presence of an amount of rinse agent in chamber 10*b* above a predetermined level.

When the level of the rinse agent remaining inside the reservoir 10 becomes lower than a predetermined threshold, the amount of rinse agent which is trapped in the chamber 10*b* by opening and closing the door of the dishwasher becomes also negligible and no longer detectable by the emitter-photodetector pair 34, with which therefore provides the control unit of the dishwasher with a signal indicating that the rinse agent in the reservoir 10 has reached a "reserve" level.

The integrated dispensing device according to the present invention has a plurality of advantages.

First of all, the shape-memory wire has a limited number of changes of direction (only one change) and therefore operates in optimum conditions and with reduced friction with respect to the previously known solutions, for instance with respect to the solution disclosed in WO 2013/092813 A2, wherein the shape-memory wire follows an essentially M-shaped path, with three changes of direction between the ends thereof.

The actuator device 13, considered as a whole, has an elongate and relatively thin shape, and can be advantageously disposed in the uppermost longitudinal portion of the volume of the integrated dispensing device, subtracting a really minimum space, to the benefit of the capacity in particular of the rinse agent reservoir.

With an equal capacity of said reservoir, the integrated dispensing device according to the invention is as a whole less bulky than those according to the prior art.

The presence of the micro-switch 24 on the circuit board 15 and the use thereof in the above-described manners are extremely advantageous, since they allow to control the operation of the shape-memory wire 20, making it exempt of problems of overheating, and allowing a more precise determination of the working position of the slider 18.

The arrangement of the emitter-receiver pair 34 on the same circuit board 15, allows to adopt a single connector 16 for coupling with the control unit of the dishwasher, reducing the complexity of harnesses and the operations for setting up the connections.

The use of a shape-memory wire allows to displace the slider and the other members coupled therewith, in a relatively slow manner, which makes the operation of the rod 30 under gravity more reliable.

With respect to other integrated dispensing devices according to the prior art, which already adopted only one actuator for controlling the dispensing of both the washing agent and the rinse agent, the solution according to the present invention avoids that an even small quantity of rinse agent be dispensed when dispensing the washing agent.

Naturally, the principle of the invention remaining the same, the form of embodiments and the details of manufacture may be widely varied with respect to what has been described and illustrated merely by way of a non-limiting example, without departing thereby from the scope of the invention as defined in the annexed claims.

The invention claimed is:

1. An integrated dispensing device for a pivotable door of a washing machine, comprising
   a support body having an elongate shape, wherein there are provided first and second, longitudinally adjacent, dispensers, for a washing agent and a rinse agent, respectively; and
   an electrically controlled actuator device, coupled to the first dispenser such that when the door is closed a first energization of the actuator device causes the dispensing of the washing agent, and coupled to the second dispenser through a transmission mechanism including a pivotable interconnecting member acting to make said mechanism operative after a first energization of the actuator device after the door has been closed, to allow the dispensing of the rinse agent by at least one subsequent energization of the actuator device; said interconnecting member being adapted to assume by gravity an inactive position in which it makes said mechanism inoperative, as a consequence of opening said door;
   the actuator device comprising a stationary structure and a movable member;
   wherein said movable member of the actuator device is a slider displaceable relative to said structure along the longitudinal direction of said body, between a rest position and a working position;
   the actuator device comprising a wire of a shape-memory material, having its ends connected to said structure, and extending along a U-shaped path which passes around one portion of the slider opposite said structure;
   wherein when said wire is energized by means of an electric current, it shortens and causes a displacement of the slider from the rest position toward the working position, against the action of resilient contrast means, and when said wire is de-energized it re-elongates allowing the displacement of the slider toward the rest position;
   said interconnecting member being carried by and connected pivotably to said slider;
   wherein said stationary structure carries a position sensor device adapted to generate an electric signal when the slider reaches its working position.

2. The integrated dispensing device according to claim 1, wherein for controlling the dispensing of the rinse agent said transmission mechanism comprises a control member displaceable along the longitudinal direction of said body and having a recess facing said pivotable interconnecting member, and wherein in said body there is provided an engagement formation disposed facing and transversely spaced from the recess of said control member and having a retaining profile and a guiding profile for interaction with the pivotable interconnecting member; said profiles forming an angle, the guiding profile being inclined toward the recess of said control member;
   wherein
   when the door is closed, the interconnecting member is disposed, under gravity, against the retaining profile of said engagement formation;
   when the shape-memory wire is energized for the first time in an operating cycle of the machine, the interconnecting member abandons the retaining profile of said formation and under gravity is moved against said control member, outside said recess;
   when said wire is thereafter de-energized, the interconnecting member enters under gravity said recess of the control member;
   when said wire is de-energized, the interconnecting member engages the recess of the control member and drags the latter to start a dispensing of rinse agent;
   when said wire is finally de-energized, the interconnecting member remains in said recess, in a position transversely facing the guiding profile of said formation; and
   when the door is subsequently opened, the interconnecting member engages under gravity the guiding profile and returns in engagement with the retaining profile of said formation.

3. The integrated dispensing device according to claim 1, wherein the second dispenser comprises a reservoir adapted to communicate hydraulically with a chamber having a reduced capacity, when the door is open; said chamber being adapted to retain an amount of rinse agent when the door is closed; said stationary structure comprising sensor means adapted to provide a signal when, once the door is closed, in said chamber there is an amount of rinse agent lower than a predetermined level.

4. The integrated dispensing device according to claim 1, wherein the first dispenser comprises a receptacle for the washing agent and a cover displaceable from a position of opening to a position of closing said receptacle by rotation of a shaft mounted rotatable inside the support body, said rotation being controlled by displacement of said slider.

5. The integrated dispensing device according to claim 4, wherein the slider has an associated contrast spring tending to return the slider to the rest position and, correspondingly, return said cover to the position of closing said receptacle.

6. The integrated dispensing device according to claim 1, wherein said actuator is mounted in a longitudinal portion of the support body which, when the door is closed, extends above said first and second dispensers.

7. The integrated dispensing device according to claim 1, wherein said stationary structure comprises a circuit board to which the ends of said shape-memory wire are connected, and which carries said position sensor and said sensor means; said circuit board carrying further a single multipolar electric connector for connection with an electronic control unit of the washing machine.

* * * * *